United States Patent
Rossi et al.

(10) Patent No.: US 11,885,219 B2
(45) Date of Patent: Jan. 30, 2024

(54) CHEMICAL INJECTION SYSTEM FOR A RESOURCE EXTRACTION SYSTEM

(71) Applicant: OneSubsea IP UK Limited, London (GB)

(72) Inventors: David Rossi, Houston, TX (US); Andrew Acock, Houston, TX (US); Supriya Gupta, Houston, TX (US); Werner Menz, Houston, TX (US); Michael Van Spankeren, Houston, TX (US); Miguel Angel Hernandez de la Bastida, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 939 days.

(21) Appl. No.: 16/826,356

(22) Filed: Mar. 23, 2020

(65) Prior Publication Data
US 2021/0293141 A1   Sep. 23, 2021

(51) Int. Cl.
*E21B 49/08* (2006.01)
*E21B 47/06* (2012.01)
(Continued)

(52) U.S. Cl.
CPC .............. *E21B 49/08* (2013.01); *E21B 37/06* (2013.01); *E21B 41/02* (2013.01); *E21B 47/06* (2013.01);
(Continued)

(58) Field of Classification Search
CPC .......... E21B 49/08; E21B 37/06; E21B 41/02; E21B 47/06; E21B 47/10; E21B 49/0875;
(Continued)

(56) References Cited

U.S. PATENT DOCUMENTS

| | | | |
|---|---|---|---|
| 2011/0264373 A1* | 10/2011 | Hehmeyer | E21B 43/16 702/13 |
| 2012/0046870 A1* | 2/2012 | Lievois | G01F 1/74 702/12 |

(Continued)

FOREIGN PATENT DOCUMENTS

| | | |
|---|---|---|
| EP | 3365528 B1 | 12/2019 |
| WO | 2007107815 A1 | 9/2007 |

(Continued)

OTHER PUBLICATIONS

International Search Report and Written Opinion issued in the PCT Application PCT/US2021/054512, dated Jan. 28, 2022 (11 pages).
(Continued)

*Primary Examiner* — Mohammad Ali
*Assistant Examiner* — Dhruvkumar Patel
(74) *Attorney, Agent, or Firm* — Jeffrey D. Frantz (57) ABSTRACT

A chemical injection system for a resource extraction system includes a controller having a memory and a processor. The memory stores instructions that cause the processor to receive a first pressure from a first pressure sensor of the resource extraction system, receive a second pressure from a second pressure sensor of the resource extraction system, determine a flowrate of a produced fluid of the resource extraction system based on the first pressure and the second pressure, determine an ion concentration of the produced fluid, and adjust an injection rate of a chemical into the resource extraction system based on the flowrate of the produced fluid, the ion concentration of the produced fluid, or both.

17 Claims, 5 Drawing Sheets

(51) Int. Cl.
  *E21B 41/02* (2006.01)
  *E21B 37/06* (2006.01)
  *E21B 47/10* (2012.01)
  *G05D 11/13* (2006.01)
  *G05D 11/00* (2006.01)
  *G05D 21/00* (2006.01)
  *G01F 7/00* (2006.01)
  *G01F 1/86* (2006.01)

(52) U.S. Cl.
  CPC .......... *E21B 47/10* (2013.01); *G01F 1/86* (2013.01); *G01F 7/005* (2013.01); *G05D 11/003* (2013.01); *G05D 11/132* (2013.01); *G05D 11/138* (2013.01); *G05D 21/00* (2013.01); *E21B 49/0875* (2020.05)

(58) Field of Classification Search
  CPC .......... E21B 43/16; G01F 1/86; G01F 7/005; G05D 11/003; G05D 11/132; G05D 11/138; G05D 21/00; G05D 21/02
  See application file for complete search history.

(56) References Cited

U.S. PATENT DOCUMENTS

| | | |
|---|---|---|
| 2013/0175030 A1 | 7/2013 | Ige et al. |
| 2015/0040658 A1* | 2/2015 | Abyzov ............... G01F 25/00 73/199 |
| 2016/0186533 A1 | 6/2016 | Donzier |
| 2016/0290131 A1* | 10/2016 | Mitchell ............... E21B 49/08 |
| 2016/0312552 A1 | 10/2016 | Early et al. |
| 2016/0368782 A1* | 12/2016 | Yokoi .................. C02F 1/008 |
| 2017/0008784 A1* | 1/2017 | Shimpo ................ C02F 1/686 |
| 2017/0247986 A1* | 8/2017 | Bussell ............... E21B 47/06 |
| 2018/0134887 A1* | 5/2018 | Del Gaudio .......... C08L 33/02 |
| 2018/0163522 A1* | 6/2018 | Simpson ............... G05B 15/02 |
| 2018/0320512 A1* | 11/2018 | Anisur Rahman ..... E21B 49/00 |
| 2019/0120042 A1* | 4/2019 | Doraiswamy ........ E21B 47/107 |
| 2019/0292881 A1 | 9/2019 | Zhang et al. |

FOREIGN PATENT DOCUMENTS

| | | |
|---|---|---|
| WO | 2009137834 A2 | 11/2009 |
| WO | 2018195368 A1 | 10/2018 |

OTHER PUBLICATIONS

Fears et al., (Mar. 2015). Mitigation of Downhole Scale Deposition Leads to Production Enhancement for South Texas Eagle Ford Shale Operator. Presented at the SPE Production and Operations Symposium. Oklahoma City, Oklahoma, USA: SPE-173616-MS. (12 pages).

Jarragh et al., (Mar. 2014). Evaluation of the Effectiveness of Online Corrosion Monitoring Utilizing ER/LPR Probes and Coupon within Hydrocarbon Systems. Presented at the Corrosion 2014. San Antonio, Texas, USA: NACE-2014-3934 (14 pages).

Meza et al., (Mar. 2017). The Shushufindi Revolution: New Life and a Brighter Future for a Giant. Presented at SPE Latin Ameriac and Caribbean Mature Fields Symposium. Salvador, Texas, Brazil: SPE-185909-MS.(14 pages).

Pots et al., (Apr. 2002). Improvements on de Waard-Milliams Corrosion Prediction and Applications to Corrosion Management. Presented at the Corrosion 2002. Denver, Colorado, USA: NACE-02235 (19 pages).

Shamlooh et al., (Mar. 2019). Well Integrity Protection Using Corrosion Inhibitor Treatment System for Sour Gas Producers in Bahrain Field. Presented at the SPE Middle East Oil and Gas Show and Conference. Manama, Bahrain: SPE-194893-MS. (18 pages).

Search Report and Written Opinion of International Patent Application No. PCT/US2021/023467 dated Jul. 5, 2021; 13 pages.

* cited by examiner

CHEMICAL INJECTION SYSTEM FOR A RESOURCE EXTRACTION SYSTEM

BACKGROUND

The present disclosure relates generally to chemical injection systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Fluids (e.g., hydrocarbons) may be extracted from subsurface reservoirs and transported to the surface for commercial sales, such as for use in the power industry, transportation industry, manufacturing industry, and other applicable industries. For example, a well may be drilled into the ground to a subsurface reservoir, and equipment may be installed in the well and on the surface to facilitate extraction of the fluids. In some cases, the wells may be offshore (e.g., subsea), and the equipment may be disposed underwater, on offshore platforms, and/or on floating systems.

During operation of the well, certain events may occur at the well that may reduce efficiency of the extraction process. For example, certain fluids within the well may cause corrosion of the equipment, deposition and buildup of solids (e.g., wax, asphaltenes, hydrates, scale) on or in the equipment, or formation of foamy emulsions. However, these fluids may typically be monitored infrequently, for example, once every 3-6 months, due to remote laboratory testing of samples of the extracted fluids. Accordingly, adjustments to the well equipment that account for the results of the laboratory tests may also be performed infrequently (e.g., every 3-6 months), which may result in corrosion of the equipment, deposition and buildup of solids on or in the equipment, or foamy emulsions to increase between adjustments, reducing efficiency of well operation and the extraction process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a chemical injection system for a resource extraction system includes a controller having a memory and a processor. The memory stores instructions that cause the processor to receive a first pressure from a first pressure sensor of the resource extraction system, receive a second pressure from a second pressure sensor of the resource extraction system, determine a flowrate of a produced fluid of the resource extraction system based on the first pressure and the second pressure, determine an ion concentration of the produced fluid, and adjust an injection rate of a chemical into the resource extraction system based on the flowrate of the produced fluid, the ion concentration of the produced fluid, or both.

In another example, a method of injecting a chemical for a resource extraction system includes determining an ion concentration of a produced fluid, comparing the ion concentration of the produced fluid to a baseline ion concentration of the produced fluid, and adjusting the injection rate of the chemical into the resource extraction system based on the comparison of the ion concentration to the baseline ion concentration.

In another example, one or more tangible, non-transitory, machine-readable media includes instructions configured to cause one or more processors to receive a first pressure from a first pressure sensor of a resource extraction system, receive a second pressure from a second pressure sensor of the resource extraction system, determine a flowrate of a produced fluid of the resource extraction system based on the first pressure and the second pressure, and adjust an injection rate of a chemical into the resource extraction system based on the flowrate of the produced fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Wherever possible, like or identical reference numerals are used in the figures to identify common or the same elements. The figures are not necessarily to scale and certain features and certain views of the figures may be shown exaggerated in scale for purposes of clarification. As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As explained above, during extraction of fluids from a well, certain operational events may occur at and/or within the well that reduce efficiency of the extraction process. Such operational events may include corrosion of equipment, deposition and buildup of solids on equipment, and other events. To prevent, mitigate, and/or inhibit these operational events, certain fluid(s) (e.g., chemical(s)) may be injected into the equipment at a particular flowrate. The effective flowrate may be based on remote laboratory tests that analyze produced fluid from the well, such as laboratory tests that determine phase fractions of the produced fluid, a flowrate of the produced fluid, and other aspects of the produced fluid. For example, a technician may take a sample of the produced fluid at the well, which may then be analyzed in a laboratory setting. Accordingly, the flowrate of the injected chemicals is typically adjusted every 3-6 months, or as often as the remote laboratory tests are performed, which may cause over-injection and/or under-injection of the chemicals. For example, properties of the produced fluid may change more often than the intervals at which the laboratory tests are performed. Over-injection of the chemicals may increase costs associated with operating the well (e.g., costs associated with consuming the injected chemicals). Under-injection of the chemicals may result in occurrence of the operational events described above, such as corrosion of the equipment, deposition and buildup of solids on the equipment, and other operational events, as the injection rate is not effective enough to prevent these operational events.

The chemical injection system discussed below improves efficiency of the extraction of fluids, such as hydrocarbons (e.g., oil, natural gas), by adjusting the chemical injection rate more frequently and at a higher fidelity (e.g., at or near real-time) based on sensing, analysis, and/or control actions performed at the well or remotely from the well, rather than infrequent off-site laboratory testing. For example, sensing of a produced fluid may occur at the well and/or during operation of the well. Such analysis by the chemical injection system may include determining a flowrate of produced fluid of the well based on detected pressures at certain locations of the well (e.g., using pressure sensors disposed at the certain locations of the well), determining an ion concentration of water in the produced fluid at the well, and determining and analyzing flowrate estimates at certain locations of the well and/or the ion concentration to determine and/or predict operational events. The chemical injection system may use the determinations and analyses to determine changes in the flowrate of the produced fluid and/or changes in the ion concentration in water of the produced fluid, which may facilitate determining and/or predicting the occurrence of the operational events. Additionally, the chemical injection system may use the determinations and analyses to adjust the flowrate of chemicals injected into the well at frequent time intervals (e.g., one or more times per minute, one or more times per hour, one or more times per day) and/or based on the detected/predicted operational events. For example, based on an increased likelihood that corrosion and/or other operational events may occur, the chemical injection system may increase the flowrate of the injected chemicals. Such adjustments to the flowrate of chemicals injected into the well are more frequent than traditional systems, which may be based on laboratory tests performed every 3-6 months. Accordingly, the chemical injection system at the well may improve the efficiency of the extraction process and reduce costs associated with operation of the well. For example, the chemical injection system may provide faster response times based on the sensing and/or analyses of the produced fluid, such that no substantial delay occurs between measuring certain conditions and implementing certain control actions (e.g., adjustments to the flowrate of the injected chemicals).

Figure 1:
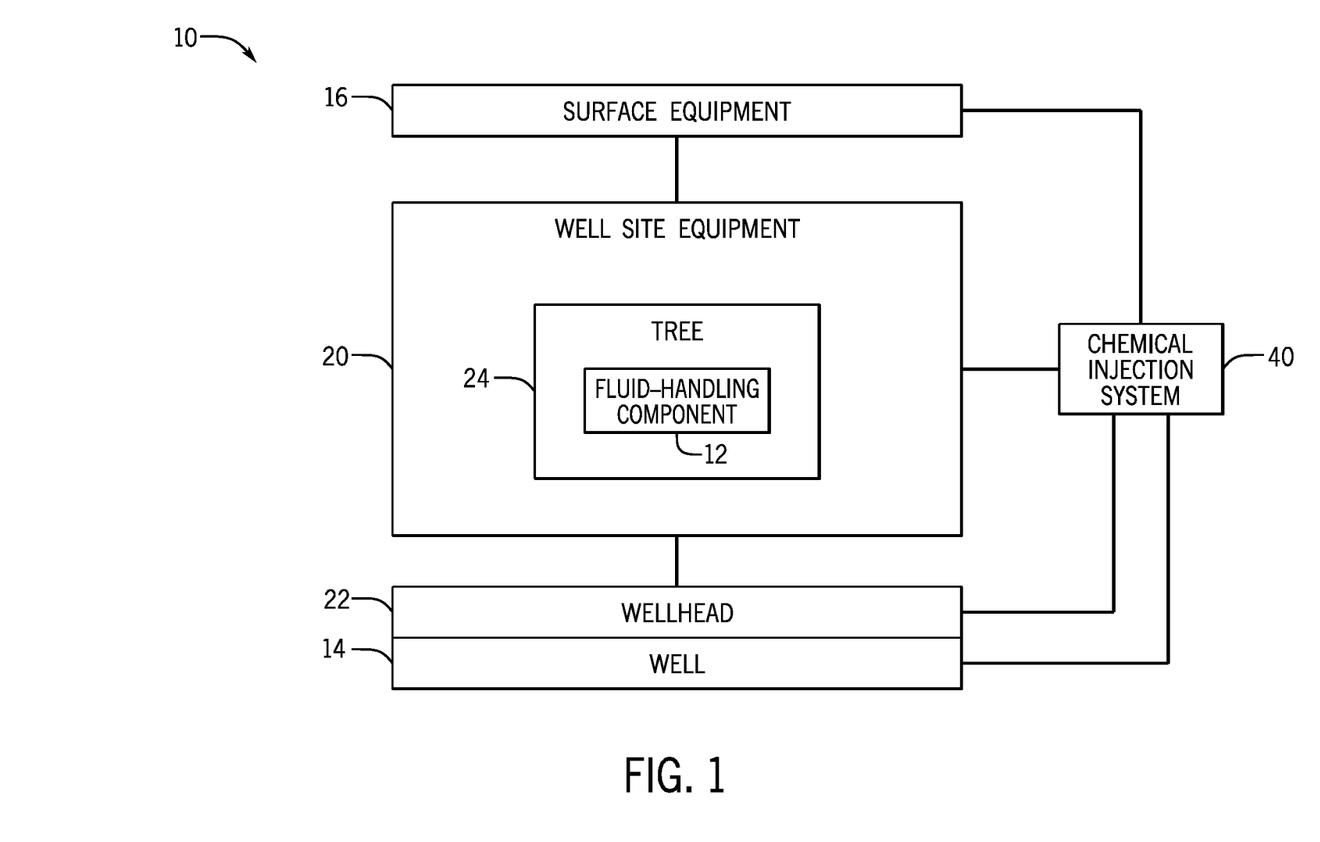
FIG. 1 is a block diagram of a resource extraction system having a chemical injection system, according to embodiments of the present disclosure.

With the foregoing in mind, FIG. 1 is a block diagram of an embodiment of a resource extraction system 10 (e.g., a mineral extraction system, a fluid extraction system, a hydrocarbon extraction system, a well system) having a fluid-handling component 12 (e.g., a choke valve, gate valve, ball valve, check valve, pressure regulating valve, conduit, hanger), according to embodiments of the present disclosure. In the illustrated embodiment, the system 10 facilitates extraction of a resource, such as oil or natural gas, from a well 14. As shown, the system 10 includes a variety of equipment, such as surface equipment 16 and well site equipment 20, for extracting the resource from the well 14 via a wellhead 22. The surface equipment 16 may include a variety of devices and systems, such as pumps, conduits, valves, power supplies, cable and hose reels, control units, a diverter, a gimbal, a spider, and the like. As shown, the well site equipment 20 includes a production tree 24, also commonly referred to as a "Christmas tree." The tree 24 may include fluid-handling components 12 that control the flow of an extracted resource out of the well 14 and upward toward the surface equipment 16 and/or that control the flow of injected fluids (e.g., chemicals) into the well 14. For example, the tree 24 may include various valves, conduits, flow meters, sensors, and so forth. While the fluid-handling component 12 is shown within the tree 24 in FIG. 1, it should be understood that the fluid-handling component 12 disclosed herein may be used in any portion of the system 10, such as the surface equipment 16, the well site equipment 20, the wellhead 22, and/or subsea equipment, for example.

The resource extraction system 10 includes a chemical injection system 40 that injects chemicals into the well 14 that may prevent, mitigate, and/or inhibit certain operational events at the well 14 and/or at the resource extraction system 10. For example, the injected chemicals may prevent, mitigate, and/or inhibit corrosion of equipment, deposition and buildup of solids on equipment, and other events. Examples of such chemicals may include corrosion inhibitors, scale removal and/or prevention agents, H2S scavengers, demulsifiers, flow improvers, hydrate inhibitors, and other types of chemicals that may enhance operation of the resource extraction system 10. The chemical injection system 40 may include other portion(s) of the resource extraction system 10, such as the surface equipment 16 or portion(s) thereof, the well site equipment 20 or portion(s) thereof, the wellhead 22 or portion(s) thereof, and/or subsea equipment, for example.

Figure 2:
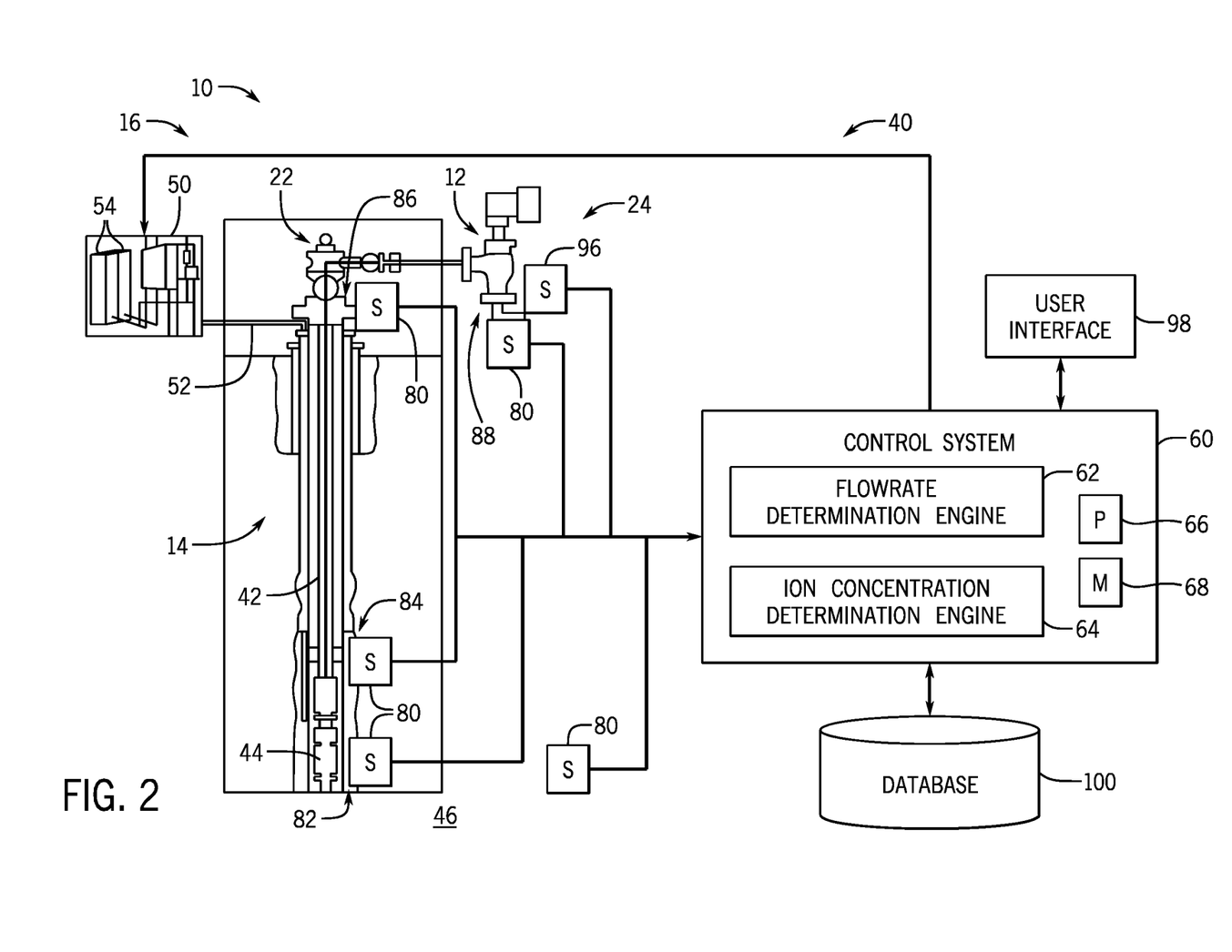
FIG. 2 is a schematic diagram of a chemical injection system of the resource extraction system of FIG. 1, according to embodiments of the present disclosure.

FIG. 2 is a schematic diagram of the chemical injection system 40 of the resource extraction system 10 of FIG. 1, according to embodiments of the present disclosure. As described above, the resource extraction system 10 facilitates extraction of a resource from the well 14. The resource extraction system 10 includes tubing 42 and a pump 44 (e.g., an electro-submersible pump) disposed adjacent to the tubing 42. The pump 44 may pump the resource from a reservoir 46 and into the tubing 42. In certain embodiments, the resource extraction system 10 may include a surface pump in addition to and/or in place of the pump 44, such that the surface pump may pump the resource from the reservoir 46 and into the tubing 42. In some embodiments, the resource extraction system 10 may not include a pump, such that the resource flows naturally from the reservoir 46 and into the tubing 42. The resource extraction system 10 causes the resource to flow from the reservoir 46, through the pump 44, through the tubing 42, through the wellhead 22, and through the fluid-handling component 12. As illustrated, the fluid handling component 12 is a choke valve that controls flowrate of a produced fluid (e.g., oil, gas, and/or water) from the well 14. In certain embodiments, the chemical injection system 40 may include the pump 44, the tubing 42, the wellhead 22, the fluid-handling component 12, or portion(s) thereof.

The chemical injection system 40 includes a chemical injection pump 50 that injects chemical(s) in the form of liquid(s) into the well 14. For example, the chemical injection pump 50 may inject the chemicals (e.g., inhibition chemicals) into and/or around the tubing 42 to prevent and/or inhibit certain operational events, such as corrosion of the tubing 42 and/or the pump 44, deposition and buildup of solids on the tubing 42 and/or the pump 44, and other events. In certain embodiments, the injected chemicals may include corrosion inhibitors, scale removal agents, and/or scale inhibitor agents. In some embodiments, such injected chemicals may include components of methanol, ethylene glycol, or any other suitable chemical that inhibits corrosion or deposition or buildup of solids. The chemical injection system 40 includes injection tubing 52 coupled to the injection pump 50 and the tubing 42, which enables the injected chemicals to flow from the injection pump 50 to the tubing 42. While the chemical injection system 40 is illustrated with the injection tubing 52 coupled to the tubing 42 adjacent and/or at the wellhead 22, the injection tubing 52 may be coupled to the tubing 42 at other locations, such that the chemical injection system 40 injects chemicals into the well 14 at other locations. For example, the chemical injection system 40 may inject chemicals at a bottom of the well 14 and/or at a middle portion of the well 14 in addition to or in place of injecting at the wellhead 22.

The chemical injection system 40 may inject the chemicals at a rate that maintains a volume of the injected chemicals per unit volume of water of the produced fluid (e.g., parts per million (ppm)). For example, the chemical injection rate may be 0.2 United States gallons per day (USgal/day) to maintain 50 ppm of the injected chemicals for every 100 barrels of water per day (e.g., bbl/day) produced from the resource extraction system 10. If the produced water rate increases to 200 bbl/day, the chemical injection rate may be increased to 0.4 USgal/day to maintain the 50 ppm of the injected chemicals. In other embodiments, chemical injection system 40 may inject the chemicals at a rate that maintains another suitable volumetric concentration of the injected chemicals in water. In some embodiments, the injection tubing 52 may be omitted, such that the injection pump is directly fluidly coupled to the tubing 42.

The chemicals may be stored in storage tanks 54 prior to injection into the well 14. In some embodiments, the chemical injection system 40 may include additional chemical injection pumps 50, such as one chemical injection pump 50 for each chemical injected into the well 14.

The chemical injection system 40 includes a control system 60 that determines a target injection rate (e.g., based on a minimum effective dosage (MED)) of the chemicals injected into the well 14 by the injection pump 50 and to control the injection pump 50 based on the target injection rate. In some embodiments, the control system 60 may determine a separate, independent target injection rate for each injected chemical of multiple injected chemicals. The chemical injection system 40 may determine the target injection rate based on estimated flowrate(s) of the produced fluid at area(s) of the resource extraction system 10 and/or based on an ion concentration in/of water of the produced fluid. For example, the control system 60 may include a flowrate determination engine 62 that determines the estimated flowrates at the different areas of the resource extraction system 10 and/or an ion concentration determination engine 64 that determines the ion concentration in water the produced fluid. Additionally, the control system 60 includes a processor 66 and a memory 68. In certain embodiments, the flowrate determination engine 62 and/or the ion concentration determination engine 64 may be stored in the memory 68, and the processor 66 may execute the engine 62 and/or the engine 64. In some embodiments, the engine 62 and/or the engine 64 may be part of other control system(s). For the purposes of this disclosure, the term "engine" may include software (e.g., instructions to be executed by the processor 66 and stored in the memory 68 or another storage device), hardware (e.g., circuitry), or a combination of the two.

The flowrate determination engine 62 may determine the estimated flowrates at areas of the resource extraction system 10 based on sensed pressures. For example, the chemical injection system 40 may include pressure sensors 80 (e.g., pressure gauges) disposed along the resource extraction system 10 that sense a pressure of the produced fluid within the resource extraction system 10 at certain locations. As illustrated, the chemical injection system 40 includes the pressure sensors 80 at the reservoir 46 (e.g., at a depth and/or elevation along the well 14 where the produced fluid enter the wells from the reservoir 46, such as through perforations in tubing of the well 14), at a pump intake location 82 (e.g., an intake to the pump 44), at a pump discharge location 84 (e.g., a discharge of the pump 44 and/or an inlet of the tubing 42), at a tubing outlet location 86 (e.g., an outlet of the tubing 42 and/or an inlet of the wellhead 22), and at a choke location 88 (e.g., at an outlet of the fluid-handling component 12 and/or the choke). In certain embodiments, one or more of the pressure sensors 80 may be omitted, and/or the chemical injection system 40 may include additional pressure sensors 80 that sense the pressure of the produced fluid at other locations along the resource extraction system 10. Each pressure sensor 80 may output a sensor signal indicative of the pressure of the fluid at the respective location of the resource extraction system 10 to the control system 60.

The flowrate determination engine 62 may determine the estimated flowrates using any two or more pressures sensed by two or more pressure sensors 80. For example, the flowrate determination engine 62 may estimate a flowrate of the fluid between the reservoir 46 and the pump intake location 82 based on the sensed pressures at the reservoir 46 and the pump intake location 82. As another example, the flowrate determination engine 62 may estimate a flowrate of the fluid in/through the pump 44 based on the sensed pressures at the pump intake location 82 and the pump discharge location 84. As yet another example, the flowrate determination engine 62 may estimate a flowrate of the fluid in/through the tubing 42 based on the sensed pressures at the pump discharge location 84 and the tubing outlet location 86. In one example, the flowrate determination engine 62 may estimate a flowrate of the fluid in/through the fluid-handling component 12 based on the sensed pressures at the tubing outlet location 86 and the choke location 88. In some embodiments, the flowrate determination engine 62 may determine the estimated flowrate of the produced fluid at certain portions of the resource extraction system 10 based on other combinations of the sensed pressures.

In certain embodiments, the flowrate determination engine 62 may determine the estimated flowrates based on models and/or equations corresponding to the locations of the resource extraction system at which the pressures are sensed. For example, the models/equations may use a cross-sectional area open to fluid flow at each location, the sensed pressures, properties of the fluid passing through each location (e.g., density, oil-water-gas phase fractions, concentration, viscosity), and other measurements and properties to determine the estimated flowrates. The properties of the produced fluid may be updated periodically (e.g., one or more times per minute, one or more times per hour, one or more times per day, one or more times per month) to accurately determine the estimated flowrates.

In some embodiments, the flowrate determination engine 62 may determine an uncertainty value associated with each estimated flowrate that generally corresponds to an estimated accuracy of the estimated flowrate. The uncertainty value may be based on the location along the resource extraction system at which the flowrate is being estimated, type(s) of the pressure sensors 80, a particular pressure sensor 80 that may be historically more or less accurate than other pressure sensors 80, a stability of the land structure surrounding the resource extraction system 10, and other factors. For example, a pressure sensor 80 that is historically more accurate than other pressure sensors 80 may decrease the uncertainty value, a location of the pressure sensor 80 along the resource extraction system 10 that is more turbulent relative other locations may increase the uncertainty value (e.g., due to the potential of the multiphase fluid at the turbulent location to form slugs, such as water or oil slugs in gas, that can cause dynamic activity in the pressure sensor 80), and/or a more reliable type of pressure sensor 80 relative to other types of the pressure sensor 80 may increase the uncertainty value. By way of example, the pressure sensor 80 at the pump intake location 82 may generally experience more turbulence relative to the other pressure sensors 80 due to unstable flow and/or slugging (e.g., water and/or oil slugs in gas), which may increase an uncertainty value of an estimated flowrate of the produced fluid that is determined using a pressure sensed by the pressure sensor 80 at the pump intake location 82. Additionally or alternatively, the pressure sensor 80 at the pump intake location 82 may be a type that is generally more accurate relative to other potential types of pressure sensors, which decrease the uncertainty value.

The phase fractions of the produced fluid may include fractional percentages of oil, water, gas, and other fluids of the produced fluid. The phase fraction information may be received by the control system 60 (e.g., via user input) and/or may be determined by the control system 60. For example, the control system 60 may include a sensor that senses the phase fractions of the produced fluid. In certain embodiments, such a sensor may be configured to sense electrical measurements due to the different phases (e.g., water, oil, gas) of the produced fluid having different electrical properties (e.g., different resistivity and/or dielectric properties), and the control system 60 may determine the phase fractions of the produced fluid based on the electrical measurements. In some embodiments, the sensor may sense temperatures of the produced fluid, and the control system 60 may determine the phase fractions of the produced fluid based on the temperatures due to the phases having different thermal properties (e.g., thermal heat capacity properties). In certain embodiments, the sensor may sense the density of the produced fluid, and the control system 60 may determine the phase fractions of the produced fluid based on the density due to the phases having different densities (e.g., gases and liquids having different densities).

In certain embodiments, the flowrate determination engine 62 may determine an overall multi-phase flowrate of the produced fluid of the resource extraction system 10 based on the estimated flowrates and/or the uncertainty value of one or more of the estimated flowrates. For example, the flowrate determination engine 62 may determine the overall flowrate as a weighted average of the estimated flowrates, based on the uncertainty values associated with the estimated flowrates, and based on phase fractions data of the produced fluid (e.g., mass phase fractions of oil, gas, and water of the produced fluid). That is, a weight may be assigned to each estimated flowrate based on the corresponding uncertainty values, and the flowrate determination engine 62 may determine the overall flowrate by applying (e.g., multiplying) the weights to the corresponding estimated flowrates and summing the resulting products. In certain embodiments, the flowrate determination engine 62 may determine the overall flowrate by applying (e.g., multiplying) the weights to the corresponding estimated flowrates and averaging the resulting products. In addition to the methods and embodiments for determining the flowrate estimates and the overall flowrate described herein, the fluid injection system 40 may include methods and embodiments for determining flowrate estimates and an overall flowrate as described in PCT/US2018/028457, the entire disclosure of which is hereby incorporated by reference herein. In certain embodiments, the chemical injection system 40, and/or the resource extraction system 10 generally, may include a flowrate sensor that senses (e.g., directly senses) the flowrate each phase (e.g., the individual oil, water, and/or gas flowrates, or an indication such as a mass flow rate) and/or the overall flowrate of the produced fluid of the well 14.

The ion concentration determination engine 64 may determine an ion concentration of water within the produced fluid (e.g., an ion concentration of the portion or phase fraction of the produced fluid including water). For example, the chemical injection system 40 may include an ion sensor 96 disposed at the fluid-handling component 12 (e.g., at the choke). In certain embodiments, the ion sensor 96 may be disposed elsewhere along the resource extraction system 10. The ion sensor 96 may include any suitable sensor that senses type(s) of ion(s), a relative mass of each type of ion, a concentration of each ion in water, and/or a relative mass of the water. For example, the ion sensor 96 may include an ion-sensitive electrode with a selective membrane and a reference electrode. An electrical potential may be generated for the electrodes that may be measured to determine the types and/or relative concentrations of each ion. The ion sensor 96 may output a sensor signal indicative of the types of ions, the relative mass of each type of ion, and/or the relative mass of the water to the control system 60.

The ion concentration determination engine 64 may determine the ion concentration of the water of the produced fluid based on the sensed data received from ion sensor 96, other data of the produced fluid, and/or data of the resource extraction system 10. For example, the ion concentration determination engine 64 may determine the ion concentration based on the types of ions, the relative mass of each type of ion, the relative mass of the water to the control system 60, and/or a mass percentage of the water within the produced fluid. The ion concentration determination engine 64 may determine the ion concentration of the water of the produced fluid periodically (e.g., one or more times per minute, one or more times per hour, one or more times per day, one or more times per month) to accurately determine the ion concentration of the water. In some embodiments, the ion concentration determination engine 64 may determine an uncertainty value associated with the ion concentration.

In certain embodiments, the control system 60 may determine the occurrence and/or the potential future occurrence of an operational event based on the estimated flowrates determined by the flowrate determination engine 62 and/or based on the ion concentration determined by the ion concentration determination engine 64. For example, based on a difference between two or more estimated flowrates being significant (e.g., exceeding an estimated flowrate threshold value), the control system 60 may determine that an operational event has occurred at a location of the resource extraction system 10 at which one of flowrates is estimated and/or at a portion of the resource extraction system 10 between the locations of the resource extraction system 10 at which the flowrates are estimated. In some embodiments, the estimated flowrate threshold value may be a percentage difference between two or more estimated flowrates (e.g., greater than or equal to a difference of 5, 10%, 15%, 20%, 25%, 30%, 35%, 40%, 45%, 50%, 60%, 75%, 85%, 95%, 99%, and so on).

By way of specific example, if a difference between a first estimated flowrate of the produced fluid through the pump 44 (e.g., as determined based on the sensed pressure at the pump intake location 82 and the sensed pressure at the pump discharge location 84) and a second estimated flowrate of the produced fluid through the tubing 42 (e.g., as determined based on the sensed pressure at the pump discharge location 84 and the sensed pressure at the tubing outlet location 86) is greater than the estimated flowrate threshold value, the control system 60 may determine that an operational event has occurred at the pump 44 and/or at the tubing 42 or that the operational event may occur at the pump 44 and/or at the tubing 42. If the first estimated flowrate at the pump 44 is greater than the second estimated flowrate at the tubing 42 and the difference exceeds the estimated flowrate threshold value, the control system 60 may determine that an operational event such as a leak has occurred at the pump 44, at the tubing 42, and/or at a coupling between the pump 44 and the tubing 42 (e.g., a leak that would cause the flowrate of the produced fluid to drop as the produced fluid moves through the pump 44 and/or the tubing 42 toward the wellhead 22).

In certain embodiments, the difference (e.g., numerical difference and/or percentage difference) between two or more estimated flowrate may indicate a severity of the operational event. For example, a relatively high difference between the estimated flowrates may indicate a more severe operational event, such as more corrosion and/or and larger constriction, compared to a relatively low difference that may indicate a less severe operational event. In some embodiments, the difference between the estimated flowrates changing over a given period of time (e.g., a minute, an hour, a day, a month) may indicate the severity of the operational event. For example, an increasing difference between the estimated flowrates over the period of time may indicate an increasing severity of the operational event and/or an increased likelihood of the operational event. A decreasing difference between the estimated flowrates over the period of time may indicate a decreasing severity of the operational event and/or a decreased likelihood of the operational event.

Additionally or alternatively, based on the ion concentration of the produced fluid indicating an increased level of a particular type of ion (e.g., relative to a concentration threshold value, relative to a previous ion concentration measurement, and/or relative to a baseline/predetermined ion concentration), the control system 60 may determine that there is a risk that an operational event may occur. The previous ion concentration may be a previous measurement received from the ion sensor 96. For example, based on a level of iron and manganese and/or a level of chlorides in the water of the produced fluid increasing by an amount greater than the concentration threshold value (e.g., based on a difference between a previous amount of the ion and a current amount of the ion exceeding the concentration threshold value), the control system 60 may determine that there is a future risk of corrosion occurring within the resource extraction system 10, such as at the pump 44 and/or at the tubing 42. In another example, if the ion concentration indicates a decrease in barium and sulfate by an amount greater than the concentration threshold value, a decrease in calcium and sulfate by an amount greater than the concentration threshold value, a decrease in calcium and bicarbonate by an amount greater than the concentration threshold value, and/or a decrease in sodium and chlorides by an amount greater than the concentration threshold value, the control system 60 may determine that there is an increased risk that scale buildup is precipitating on an exterior of a housing of the pump 44. In certain embodiments, the ion concentration may be used in combination with the estimated flowrates by the control system 60 to determine that an operational event is at risk of occurring or has occurred, such as corrosion and a location of such corrosion. For example, an increased level of iron (e.g., based on the concentration threshold value) in the water of the produced fluid along with a significant difference between the estimated flowrate through the pump 44 and the estimated flowrate through the tubing 42 (e.g., based on the estimated flowrate threshold value) may indicate that the tubing 42 has corroded to the point that produced fluid is leaking from the tubing 42.

In certain embodiments, the control system 60 may compare the ion concentration to a baseline ion concentration and adjust the injection rate of the chemicals based on the comparison. For example, based on the ion concentration being greater than the baseline ion concentration, the control system 60 may increase or decrease the injection rate of the chemicals. Based on the ion concentration being less than the baseline ion concentration, the control system 60 may increase or decrease the injection rate of the chemicals. The control system may determine the baseline ion concentration based on a previously measured ion concentration, an average of multiple previously measured ion concentrations, a specific previous ion concentration corresponding to optimal operation of the resource extraction system 10, an expected ion concentration determined based on dosage calculations, and other suitable parameters. In some embodiments, the control system 60 may determine other values based on the ion concentration and control the injection rate of the chemicals based on the other values.

Based on the estimated flowrates, the ion concentration, and/or the determined occurrence of certain operational events, the control system 60 may determine the target injection rate of the injected chemicals provided by the chemical injection system 40. For example, the control system 60 may determine the target injection rate of the injected chemicals as a percentage (e.g., thirty percent, fifty percent, seventy percent, ninety percent, ninety-five percent), as a linear function, or as a non-linear function of one or more of the estimated flowrates and/or of the overall flowrate. Additionally, the control system 60 may determine a threshold value of the target injection rate based on certain factors, such as the uncertainty values associates with the estimated flowrates. In certain embodiments, the control system 60 may determine the target injection rate of the injected chemicals based on the overall flowrate (e.g., as determined based on the estimated flowrates) and the water ion concentration.

As illustrated, the chemical injection system 40 includes a user interface 98 communicatively coupled to the control system 60 and a database 100 communicatively coupled to the control system 60. In certain embodiments, the user interface 98 and/or the database 100 may be included in the control system 60. The user interface 98 may facilitate user interaction with the chemical injection system 40, such as to provide notifications regarding determined operational events and the target injection rate and/or to enable user control of the chemical injection system 40, such as selection of the target injection rate and selection of certain operational parameters (e.g., types of the injected chemical(s)). The database 100 may store data sensed, determined, and/or used by the chemical injection system 40, such as sensed pressures along the resource extraction system 10, determined flowrate estimates, an overall flowrate, properties of the produced fluid, properties of the injected chemicals, target flow rates, and other data related to the chemical injection system 40. The user interface 98 may be disposed adjacent to wellhead 22 or at a remote location in the case of a remotely controlled resource extraction system 10. For example, the user interface 98 may include one or more of a button, a keyboard, a mouse, a trackpad, a touchscreen display, and/or the like to enable user interaction with the control system 60. Additionally, the user interface 98 may include an electronic display to provide a visual representation of information, for example, via a graphical user interface (GUI), an application interface, text, a still image, video content, or a combination thereof. The user interface 98 may receive inputs from the user (e.g., the operator of the chemical injection system 40 and/or the resource extraction system 10).

In certain embodiments, the resource extraction system 10 and/or the chemical injection system 40 may include additional controllers, processors, and/or memories to perform various functions. In some embodiments, the memory 68 and other memories of the chemical injection system 40 may include one or more tangible, non-transitory, computer-readable media that store instructions executable by the processor 66 and/or data to be processed by the processor 66. For example, the memory 68 may include random access memory (RAM), read-only memory (ROM), rewritable non-volatile memory such as flash memory, hard drives, optical discs, and/or other types of memory. Additionally, the processor 66 and other processors of the chemical injection system 40 may include one or more general purpose microprocessors, one or more application-specific integrated circuits (ASICs), and/or one or more field programmable gate arrays (FPGAs).

The pressure sensors 80, the ion sensor 96, and/or the injection pump 50 may be connected to and communicatively coupled with the control system 60 via a wired connection (e.g., Ethernet, universal serial bus (USB), controller area network (CAN) bus, or a serial control and communications data network (an "ISO bus")). For example, the pressure sensors 80 and/or the ion sensor 96 may output sensor signals to, and the injection pump 50 may receive control signals from, the control system 60 via the wired connection. Additionally or alternatively, the pressure sensors 80, the ion sensor 96, and/or the injection pump 50 may communicate with the control system 60 via a wireless connection. For example, the injection pump 50 may include a transceiver that receives control signals from a controller transceiver of the control system 60. Each of the injection pump 50 transceiver and the controller transceiver may utilize any suitable wireless communication protocol, such as a standard protocol (e.g., Wi-Fi or Bluetooth), or a proprietary protocol.

The chemical injection system 40, or portions thereof (e.g., the injection pump 50, the storage tanks 54, the control system 60, the user interface 98, and/or the database 100), may be disposed locally at the resource extraction system 10 to facilitate frequent sensing of the pressures along the resource extraction system 10, frequent sensing of ions in water of the produced fluid, and frequent updates to the target injection rate of the injected chemicals. For example, rather than waiting on well tests to determine estimated flow rates of the resource extraction system 10 and/or remote laboratory tests to determine the ion concentration, the chemical injection system 40 may (at least partially) locally determine the estimated flow rates of the resource extraction system 10, the ion concentration, and the occurrence or risk of occurrence of certain operational events. Based on such determinations, the chemical injection system 40 may determine the target injection rate of the injected chemicals and adjust operation of the injection pump 50 based on the target injection rate. As such, the chemical injection system 40 may adjust injection of the chemicals more frequently than traditional systems, thereby substantially preventing over-injection and/or under-injection of the chemicals. Preventing over-injection of the chemicals may reduce costs associated with operating the well (e.g., costs associated with consuming the injected chemicals). Preventing under-injection of the chemicals may substantially prevent occurrence of the operational events described above, such as corrosion of the equipment, deposition and buildup of solids on the equipment, and other operational events. Accordingly, the chemical injection system 40 may make adjustments to the injection of chemicals in real-time to provide a better response to changes in operating parameters of the resource extraction system 10.

Figure 3:
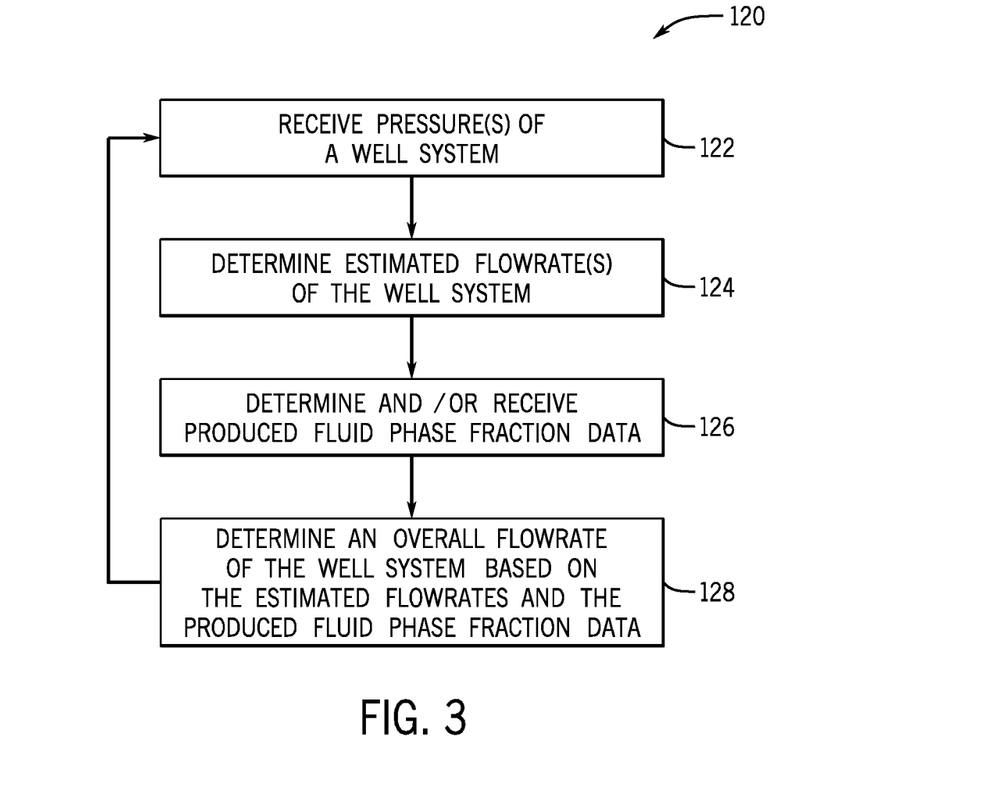
FIG. 3 is a flow diagram of a method for determining a flowrate of a resource extraction system, according to embodiments of the present disclosure.

FIG. 3 is a flow diagram of a method 120 for determining an overall flowrate of the resource extraction system 10 based on estimated flowrates and produced fluid phase fraction data, according to embodiments of the present disclosure. The method 120, or portions thereof, may be performed by the control system 60 of the chemical injection system 40. For example, the method 120 may be stored as instructions (e.g., in the form of software) in the memory 68, which are executed by the processor 66. Moreover, while the method 120 illustrates performing certain steps in a certain sequence, in some embodiments, at least some steps may be performed in a different sequence, or skipped altogether.

The method 120 begins at block 122, where pressure(s) of the resource extraction system 10 are received. For example, the control system 60 may receive a sensor signal indicative of a pressure from multiple sensors 80 disposed along the resource extraction system 10. At block 124, estimated flowrates of the resource extraction system are determined. For example, the control system 60 may determine an estimated flowrate using two of the pressures received from two of the sensors 80 at block 122. The control system 60 may determine any suitable number of estimated flowrates, such as one estimated flowrate, two estimated flowrates, three estimated flowrates, or more. Each flowrate may generally correspond to the locations of the resource extraction system 10 at which the corresponding pressures were sensed (e.g., the reservoir 46, the pump intake 82, the pump discharge 84, the tubing outlet 86, and the choke outlet 88).

At block 126, produced fluid phase fraction data is determined and/or received. The phase fractions of the produced fluid may include mass or volume phase fractions of oil, water, gas, and other fluids of the produced fluid. The phase fractions may be received by the control system 60 (e.g., via the user interface 98) and/or may be determined by the control system 60. For example, the control system 60 may include a sensor that senses the phase fractions of the produced fluid.

At block 128, an overall flowrate of the resource extraction system 10 is determined based on the estimated flowrates and the produced fluid phase fraction data. For example, as described above, the flowrate determination engine 62 may determine the overall flowrate as a weighted average of the estimated flowrates, based on the uncertainty values associated with the estimated flowrates, and/or based on the phase fraction data of the produced fluid. In certain embodiments, the flowrate determination engine 62 may determine the overall flowrate based only on the weighted average of the estimated flowrates (e.g., accounting for the uncertainty values associated with the estimated flowrates). In some embodiments, the flowrate determination engine may determine an overall flowrate of the oil, the gas, or the water of the produced fluid, individually, based on the weighted average of the estimated flowrates, the uncertainty values associated with the estimated flowrates, and/or the phase fraction data of the produced fluid. For example, after determining the overall flowrate, the flowrate determination engine 62 may multiply the overall flowrate by a percentage value representing a portion of the produced fluid having oil, gas, or water, to determine a flowrate of oil, gas, or water within the produced fluid.

Figure 4:
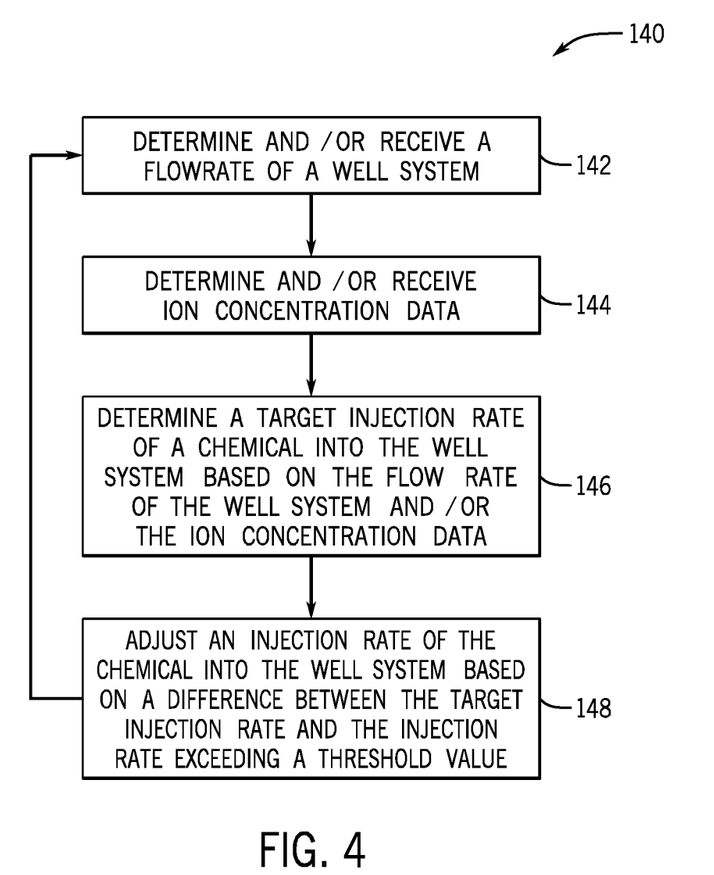
FIG. 4 is a flow diagram of a method for controlling a chemical injection system of a resource extraction system, according to embodiments of the present disclosure.

FIG. 4 is a flow diagram of a method 140 for adjusting an injection rate of chemicals into the resource extraction system 10, according to embodiments of the present disclosure. The method 140, or portions thereof, may be performed by the control system 60 of the chemical injection system 40. For example, the method 140 may be stored as instructions (e.g., in the form of software) in the memory 68, which are executed by the processor 66. Moreover, while the method 140 illustrates performing certain steps in a certain sequence, in some embodiments, at least some steps may be performed in a different sequence, or skipped altogether.

The method 140 begins at block 142, where the flowrate of the resource extraction system 10 is determined or received. For example, the control system 60 may determine the flowrate of the resource extraction system 10 as described in reference to method 120. At block 144, the ion concentration of water of the produced fluid is determined or received. For example, as set forth above, the control system 60 may determine the ion concentration based on the types of ions, the relative mass of each type of ion, the relative mass of the water, and/or based on other relative factors. In certain embodiments, the types of ions, the relative mass of each type of ion, the relative mass of the water, and/or other measured/sensed properties may be received from the ion sensor 96. At block 146, the target injection rate of the chemicals into the resource extraction system is determined based on the flowrate of the resource extraction system and/or based on the ion concentration data (e.g., by the control system 60). In certain embodiments, the control system 60 may also determine the threshold value of the target injection rate based on factors described herein, such as before, during, or after performing block 146. The control system 60 may determine the target injection rate as an injection rate of chemicals that reduces/mitigates/inhibits corrosion of equipment of the resource extraction system 10 and/or buildup of solids on the equipment of the resource extraction system 10, such that the resource extraction system 10 continues to produce fluids at a desired rate (e.g., within a threshold value of the desired rate).

At block 148, the injection rate (e.g., a current injection rate) of the chemicals into the resource extraction system 10 is adjusted based a difference between the target injection rate and the injection rate exceeding a threshold value. For example, in response to determining that the difference between the target injection rate and the injection rate is greater than the threshold value and the target injection rate being greater than the injection rate, the control system 60 may output a control signal to the injection pump 50 indicative of instructions to increase the injection rate of the chemicals into the well 14 (e.g., to match or approach the target injection rate). In response to determining that the difference is greater than the threshold value and the target injection rate being less than the injection rate, the control system 60 may output a control signal to the injection pump 50 indicative of instructions to decrease the injection rate of the chemicals into the well 14 (e.g., to match or approach the target injection rate).

Figure 5:
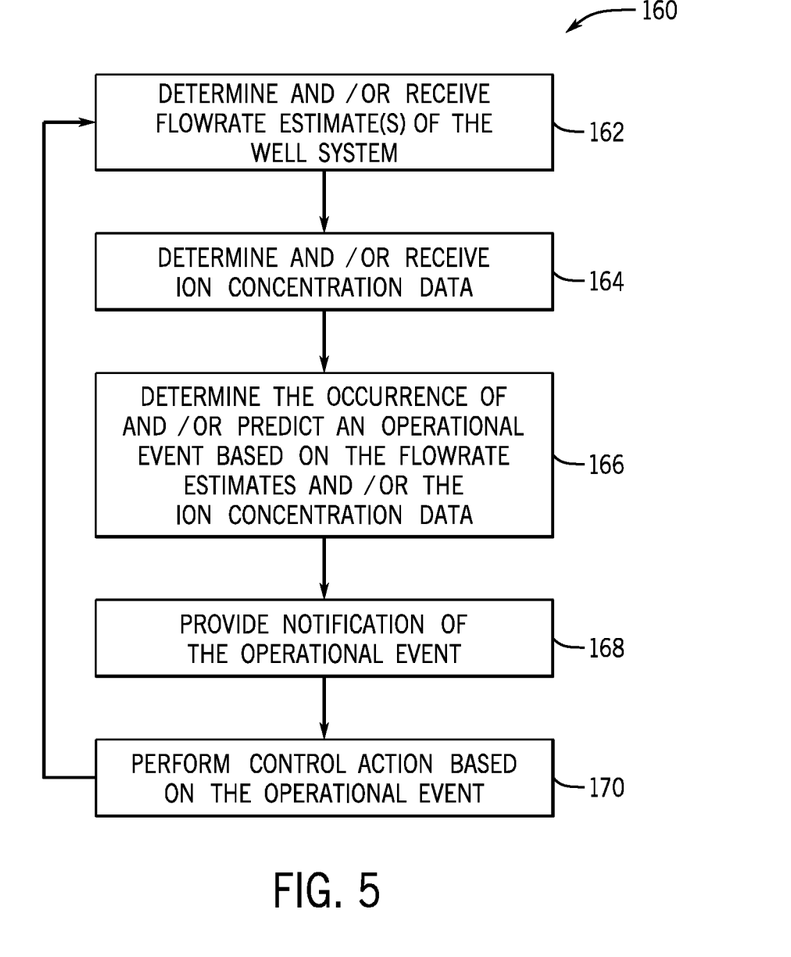
FIG. 5 is a flow diagram of a method for controlling a chemical injection system of a resource extraction system based on determining or predicting an occurrence of an operational event, according to embodiments of the present disclosure.

FIG. 5 is a flow diagram of a method 160 for performing a control action based on determining and/or predicting the occurrence of an operational event, according to embodiments of the present disclosure. As described herein, such operational events may include corrosion of equipment within the resource extraction system 10, scale buildup within the resource extraction system 10, and/or other events. The method 160, or portions thereof, may be performed by the control system 60 of the chemical injection system 40. For example, the method 160 may be stored as instructions (e.g., in the form of software) in the memory 68, which are executed by the processor 66. Moreover, while the method 160 illustrates performing certain steps in a certain sequence, in some embodiments, at least some steps may be performed in a different sequence, or skipped altogether.

The method 160 begins at block 162, where the flowrate estimates of the resource extraction system 10 are determined or received (e.g., by the control system 60). For example, the control system 60 may perform block 124 of method 120 to determine the flowrate estimates of the resource extraction system 10. At block 164, the ion concentration of water of the produced fluid is determined or received (e.g., by the control system 60). For example, the control system 60 may perform block 144 of method 140 to determine or received the ion concentration of water of the produced fluid. At block 166, the occurrence and/or the predicted occurrence of an operational event is determined based on the flowrate estimates and/or the ion concentration data. The predicted occurrence of the operational event may include the risk, probably, and/or likelihood that the operational event will occur. For example, as described above, based on a difference between two or more estimated flowrates being significant (e.g., based on the difference exceeding the estimated flowrate threshold value), the control system 60 may determine that an operational event has occurred or may occur at a location of the resource extraction system 10 at which one of flowrates is estimated and/or at a portion of the resource extraction system 10 between the locations of the resource extraction system 10 at which the flowrates are estimated. Additionally or alternatively, based on the ion concentration of water in the produced fluid indicating an increased level of a particular type of ion (e.g., based on a difference between a previous amount of the ion and a current amount of the ion exceeding the concentration threshold value), the control system 60 may determine that an operational event has occurred or may occur.

At block 168, a notification of that the operational event has occurred or may occur is provided. For example, the control system may provide a notification, via the user interface 98, indicative of the operational event determined at block 166. The notification may include sending a communication to the user interface 98 that causes the user interface 98 to display a pop-up window, a visual indicator or icon, an alarm (e.g., an audio and/or visual alarm), or another suitable notification. The communication to the user interface 98 may include an email, an SMS message, or another suitable communication mechanism. At block 170, a control action is performed based on the operational event determined at block 166. For example, the control system 60 may adjust the target injection rate of the injected chemicals based on the operational event (e.g., the occurrence of the operational event or the determination that the operational event may occur), and/or the injection rate of the chemicals based on the target injection rate. In certain embodiments, the control system 60 may adjust the injection rate of the chemicals directly based on the operational event. In some instances, the control system 60 may reduce and/or block the flow of injected chemicals into the well 14 based on the operational event. For example, if further injection of the chemicals into the well 14 would reduce an efficiency of the resource extraction system 10 and/or unnecessary waste the injected chemicals, the control system 60 may perform the control action of reducing or blocking the flow of the injected chemicals. In certain embodiments, the control system 60 may perform other control actions based on the type and/or duration of the operational event. In some embodiments, block 168 and/or block 170 may be omitted from method 160.

Technical effects of the disclosure include a chemical injection system that adjusts injection of chemicals into a well in real-time to facilitate management of the resource extraction system and improve an efficiency of operating the well. For example, by determining flowrate estimates and/or the ion concentration of water from the well on a frequent basis, the chemical injection system may determine a target injection rate of the chemicals on a frequent basis, thereby substantially preventing/reducing inefficiencies and waste associated with injection of such chemicals into the well (e.g., over-injection or under-injection of the chemicals). Additionally, technical effects of the disclosure include predicting, preventing, and/or managing certain operational event of the resource extraction system, such as corrosion of equipment, deposition and buildup of solids on equipment, and other events.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A chemical injection system for a resource extraction system, comprising:
   a controller comprising a memory and a processor, wherein the memory is configured to store instructions, wherein the instructions are configured to cause the processor to:
      receive a first pressure from a first pressure sensor located at a first location of a plurality of locations of the resource extraction system;
      receive a second pressure from a second pressure sensor located at a second location of the plurality of locations of the resource extraction system, wherein the first location is different from the second location;
      determine a flowrate of a produced fluid of the resource extraction system based on the first pressure and the second pressure;
      determine an ion concentration of the produced fluid; and
      adjust an injection rate of a chemical into the resource extraction system based on the flowrate of the produced fluid, the ion concentration of the produced fluid, or both, wherein the processor is further configured to:
         compare the ion concentration of the produced fluid to a previous ion concentration of the produced fluid;
         adjust the injection rate of the chemical into the resource extraction system based on the ion concentration of the produced fluid as the comparison of the ion concentration to the previous ion concentration, wherein comparing the ion concentration to the previous ion concentration comprises:
            (i) determining that levels of iron and manganese, a level of chlorides, or both, has increased in the produced fluid, and wherein adjusting the injection rate of the chemical into the resource extraction system comprises increasing the injection rate of the chemical into the resource extraction system; or (ii) determining that levels of barium and sulfate, levels of calcium and sulfate, levels of calcium and bicarbonate, levels of sodium and chlorides, or a combination thereof, have decreased in the produced fluid, and wherein adjusting the injection rate of the chemical into the resource extraction system comprises increasing the injection rate of the chemical into the resource extraction system.

2. The chemical injection system of claim 1, wherein the plurality of locations of the resource extraction system comprises a well location at an elevation of a reservoir, a pump intake, a pump discharge, a tubing outlet, and a choke outlet.

3. The chemical injection system of claim 1, wherein the processor is configured to:
determine a first flowrate estimate based on the first pressure and the second pressure;
receive a third pressure from a third pressure sensor of the resource extraction system, wherein the third pressure sensor is located at a third location of the plurality of locations different from the first location and the second location; and
determine a second flowrate estimate based on the third pressure and at least one of the first pressure and the second pressure.

4. The chemical injection system of claim 3, wherein the processor is configured to:
determine an increased risk of an operational event occurring based on the first flowrate estimate and the second flowrate estimate; and
provide a notification indicative of the increased risk of the operational event, perform a control action based on the increased risk of the operational event, or both.

5. The chemical injection system of claim 3, wherein the processor is configured to:
determine that an operational event has occurred based on the first flowrate estimate and the second flowrate estimate; and
provide a notification indicative of the operational event, perform a control action based on the operational event, or both.

6. The chemical injection system of claim 1, wherein the chemical is configured to mitigate corrosion of equipment of the resource extraction system, mitigate buildup of solids on the equipment of the resource extraction system, or both.

7. The chemical injection system of claim 1, wherein comparing the ion concentration to the previous ion concentration comprises determining that the levels of iron and manganese, the level of chlorides, or both, has increased in the produced fluid.

8. The chemical injection system of claim 1, wherein comparing the ion concentration to the previous ion concentration comprises determining that the levels of barium and sulfate, the levels of calcium and sulfate, the levels of calcium and bicarbonate, the levels of sodium and chlorides, or a combination thereof, have decreased in the produced fluid.

9. The chemical injection system of claim 1, wherein the processor is configured to:
determine phase fractions of the produced fluid;
determine a target injection rate of the chemical into the resource extraction system based on the flowrate of the produced fluid and the phase fractions of the produced fluid; and
adjust the injection rate of the chemical into the resource extraction system based on a difference between the target injection rate and a previous injection rate exceeding a threshold value.

10. The chemical injection system of claim 1, wherein the ion concentration of the produced fluid comprises an ion concentration of water in the produced fluid.

11. A method of injecting a chemical for a resource extraction system, the method comprising:
determining an ion concentration of a produced fluid;
comparing the ion concentration of the produced fluid to a baseline ion concentration of the produced fluid; and
adjusting an injection rate of the chemical into the resource extraction system based on the comparison of the ion concentration to the baseline ion concentration, wherein comparing the ion concentration to the baseline ion concentration comprises:
(i) determining that levels of iron and manganese, a level of chlorides, or both, has increased in the produced fluid, and wherein adjusting the injection rate of the chemical into the resource extraction system comprises increasing the injection rate of the chemical into the resource extraction system; or
(ii) determining that levels of barium and sulfate, levels of calcium and sulfate, levels of calcium and bicarbonate, levels of sodium and chlorides, or a combination thereof, have decreased in the produced fluid, and wherein adjusting the injection rate of the chemical into the resource extraction system comprises increasing the injection rate of the chemical into the resource extraction system.

12. The method of claim 11, wherein comparing the ion concentration of the produced fluid to the baseline ion concentration of the produced fluid comprises determining that a difference between a first level of the ion and a second level of the ion exceeds a concentration threshold value, wherein the first level of the ion is associated with the ion concentration of the produced fluid, and where the second level of the ion is associated with the baseline ion concentration of the produced fluid.

13. The method of claim 11, comprising determining the baseline ion concentration of the produced fluid based on previous ion concentration of the produced fluid, an average of multiple previously measured ion concentrations, an expected ion concentration, or a combination thereof.

14. The method of claim 11, comprising:
receiving a first pressure from a first pressure sensor located at a first location of a plurality of locations of the resource extraction system;
receiving a second pressure from a second pressure sensor located at a second location of the plurality of locations of the resource extraction system, wherein the first location is different from the second location;
determining a flowrate of the produced fluid of the resource extraction system based on the first pressure and the second pressure; and
adjusting the injection rate of the chemical into the resource extraction system based on the flowrate of the produced fluid and the comparison of the ion concentration to the baseline ion concentration.

15. The method of claim 14, comprising:
determining a first flowrate estimate based on the first pressure and the second pressure;
receiving a third pressure from a third pressure sensor of the resource extraction system, wherein the third pressure sensor is located at a third location of the plurality of locations;
receiving a fourth pressure from a fourth pressure sensor of the resource extraction system, wherein the fourth pressure sensor is located at a fourth location of the plurality of locations, and wherein the third location is different from the fourth location and at least one of the first location and the second location; and determining a second flowrate estimate based on the third pressure and the fourth pressure.

16. The method of claim 15, comprising:

determining an increased risk of an operational event occurring based on the first flowrate estimate and the second flowrate estimate; and providing a notification indicative of the increased risk of the operational event, performing a control action based on the increased risk of the operational event, or both.

17. One or more tangible, non-transitory, machine-readable media comprising instructions configured to cause one or more processors to:

receive a first pressure from a first pressure sensor located at a first location of a plurality of locations of a resource extraction system;

receive a second pressure from a second pressure sensor located at a second location of the plurality of locations of the resource extraction system, wherein the first location is different from the second location;

determine a flowrate of a produced fluid of the resource extraction system based on the first pressure and the second pressure;

determine an ion concentration of the produced fluid; and adjust an injection rate of a chemical into the resource extraction system based on the flowrate of the produced fluid, the ion concentration of the produced fluid, or both, wherein the instructions are further configured to cause the one or more processors to:

compare the ion concentration of the produced fluid to a previous ion concentration of the produced fluid; and adjust the injection rate of the chemical into the resource extraction system based on the ion concentration of the produced fluid as the comparison of the ion concentration to the previous ion concentration, wherein comparing the ion concentration to the previous ion concentration comprises:

(i) determining that levels of iron and manganese, a level of chlorides, or both, has increased in the produced fluid, and wherein adjusting the injection rate of the chemical into the resource extraction system comprises increasing the injection rate of the chemical into the resource extraction system; or (ii) determining that levels of barium and sulfate, levels of calcium and sulfate, levels of calcium and bicarbonate, levels of sodium and chlorides, or a combination thereof, have decreased in the produced fluid, and wherein adjusting the injection rate of the chemical into the resource extraction system comprises increasing the injection rate of the chemical into the resource extraction system.

* * * * *